US006152518A

United States Patent [19]

Schönenbach

[11] Patent Number: 6,152,518

[45] Date of Patent: Nov. 28, 2000

[54] ROOF-LINING SYSTEM FOR MOTOR-VEHICLE CONVERTIBLE ROOF

[75] Inventor: Heinz Schönenbach, Remscheid, Germany

[73] Assignee: Parat Automotive Schonenbach GmbH + Co., Remscheid, Germany

[21] Appl. No.: 09/514,617

[22] Filed: Feb. 28, 2000

[30] Foreign Application Priority Data

Mar. 3, 1999 [DE] Germany .......................... 199 09 275

[51] Int. Cl.$^{7}$ ........................ B60J 7/12

[52] U.S. Cl. ........................ 296/107.06; 296/146.14

[58] Field of Search ........................ 296/107.06, 146.14, 296/214

[56] References Cited

U.S. PATENT DOCUMENTS

| | | | |
|---|---|---|---|
| 5,540,476 | 7/1996 | Cowsert | 296/146.14 X |
| 6,015,181 | 1/2000 | Exner | 296/146.14 X |

FOREIGN PATENT DOCUMENTS

| | | | |
|---|---|---|---|
| 284931 | 10/1998 | European Pat. Off. | 296/146.14 |
| 1 959 295 | 6/1971 | Germany . | |
| 41 29 492 | 1/1993 | Germany . | |
| 4240281 | 4/1994 | Germany | 296/146.14 |
| 197 24 592 | 10/1998 | Germany . | |

*Primary Examiner*—Joseph D. Pape

*Attorney, Agent, or Firm*—Herbert Dubno; Andrew Wilford

[57] ABSTRACT

A convertible-roof window has an outside edge juxtaposed with an inside edge of an outer frame. An annular molded seal fixed to and extending between the window and frame edges secures the window in the frame and is formed with a plurality of spaced and inwardly open seats. A flexible liner formed with a window hole has an inside edge juxtaposed with the seal. A stiff mounting strip extends along and is fixed to at least a portion of the window-hole inside edge of the liner. Respective outwardly directed mounting tabs unitarily formed with the mounting strip are snugly fitted in the seats. The inside liner edge is folded over and forms an elongated pocket receiving the stiff strip. In addition the liner edge is formed at the pocket with respective holes through which the tabs project. The liner edge is stitched adjacent the strip to close the pocket. This construction is extremely simple and neat.

12 Claims, 9 Drawing Sheets

10
11
12
14
13
30
26
35
35
33
29
34
32
31

30
30
30
30
30
30
30
29
30
30
30
30

10
15
11
12'
26
25
25
25
24
24
30
29
14
25
16
35
32
13
33
31

ROOF-LINING SYSTEM FOR MOTOR-VEHICLE CONVERTIBLE ROOF

FIELD OF THE INVENTION

The present invention relates to a motor-vehicle convertible roof. More particularly this invention concerns a system for attaching the liner of such a roof around at least three sides of a window in the roof.

BACKGROUND OF THE INVENTION

A standard convertible roof has a fairly stiff but foldable outer membrane or covering and a relatively soft inner liner. There is normally at least one window set in the roof and the liner must be attached around at least three sides of its edge on the interior. The window can be secured in place by a one-piece molded seal as described in German patent documents 1,959,295 of K. Erck or 197 24 592 of L. Hartmann or by a two-piece system as described in copending application (attorney's docket 21404) or in German patent document 4,129,492.

In a standard prior-art system one half of a separable slide fastener is attached to the inside window frame and the other half to the complementary edge of the window hole in the liner material. Such a system does allow the liner to be installed and even replaced with ease, but has the disadvantage that it is difficult to install the frame-mounted faster half and that the fastener bunches up when the roof is folded when stowed.

In another system an aluminum edge is attached to the liner and is secured to the window frame by a plastic trim strip and a row of screws. This assembly is complex and difficult to install.

OBJECTS OF THE INVENTION

It is therefore an object of the present invention to provide an improved system for securing an edge of a roof liner around at least three sides of a window frame of a convertible roof.

Another object is the provision of such an improved system for securing an edge of a roof liner around a window frame of a convertible roof which overcomes the above-given disadvantages, that is which is of simple construction, which can be assembled and disassembled with ease, and which is inexpensive.

SUMMARY OF THE INVENTION

A convertible-roof window has an outside edge juxtaposed with an inside edge of an outer frame. An annular molded seal fixed to and extending between the window and frame edges secures the window in the frame and is formed with a plurality of spaced and inwardly open seats. According to the invention a flexible liner formed with a window hole has an inside edge juxtaposed with the seal. A stiff mounting strip extends along and is fixed to at least a portion of the window-hole inside edge of the liner. Respective outwardly directed mounting tabs unitarily formed with the mounting strip are snugly fitted in the seats.

Thus with this system the inside edge of the liner is provided with the mounting strip whose tabs are inserted into the seats of the seal to secure this edge around at least three sides of the window. The installation is extremely simple and neat and can in fact be done with no tools. The parts can even be separated if necessary According to the invention the inside liner edge is folded over and forms an elongated pocket receiving the stiff strip.

In addition the liner edge is formed at the pocket with respective holes through which the tabs project. The liner edge is stitched adjacent the strip to close the pocket. This construction is extremely simple and neat. On the inside the liner runs neatly right up to the window and, in fact, no part of the mounting strip is exposed.

The strip according to the invention can be of metal or of a rigid plastic. Either way it is easily produced with the integral tabs. The seats are molded right into the normally polyurethane seal.

The seats in accordance with the invention are elongated parallel to the strip and the tabs are complementarily elongated. In this manner the inside liner edge is solidly attached to the roof structure.

The seats are provided according to the invention with clips elastically retaining the tabs in the seats. These clips are metallic. They may be formed as part of a reinforcing element overlying an inner face of the seal. In this case the strip has an outwardly directed inside leg bearing on an outside surface of the reinforcing element. This leg prevents the strip from being pulled out of the seats by tension in the liner.

In another system according to the invention the seal includes a window part fixed to the window outside edge and a frame part fixed to the frame inside edge and fitting complementary with the window part. Both parts are molded of polyurethane. With this system the seal can be disassembled for changing the window if necessary. In the assembled condition, the inside liner edge covers the screws that hold the two seal parts together for an installation where the window looks like it is mounted right in the liner.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
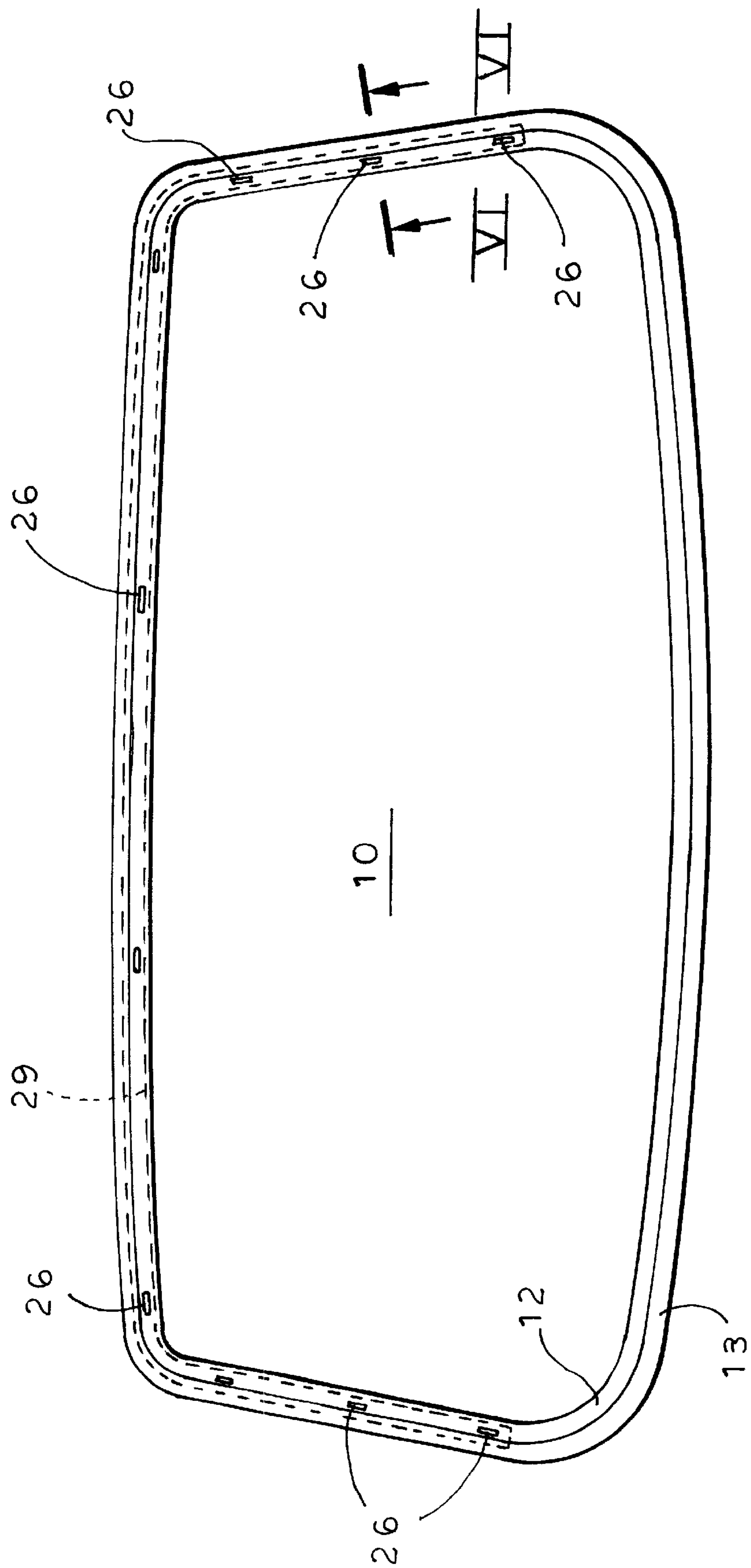
FIG. 1 is a small-scale inside view of a window for a convertible roof with no liner mounted.
Figure 2:
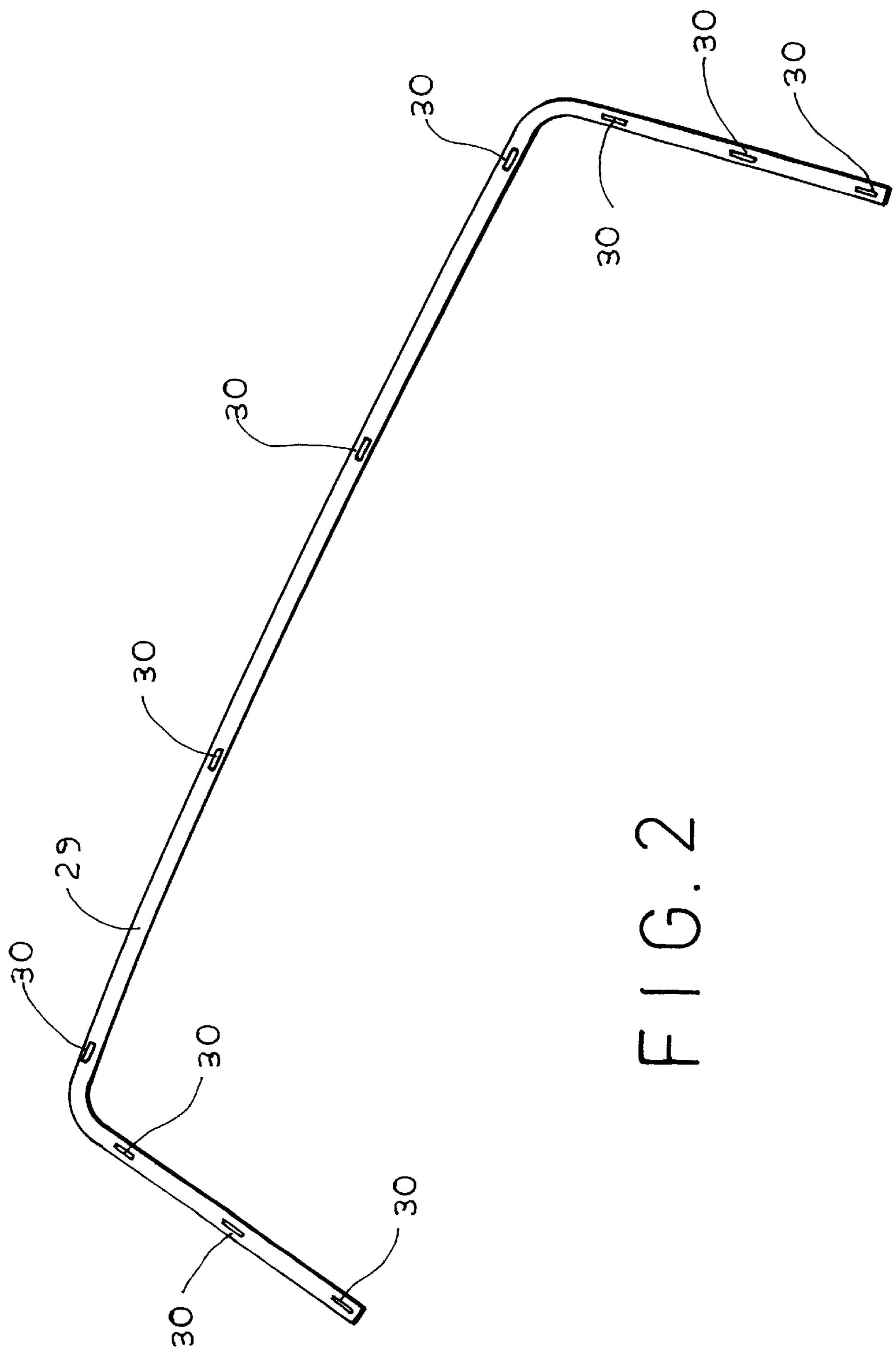
FIG. 2 is a perspective view of an element of the frame.
Figure 3:
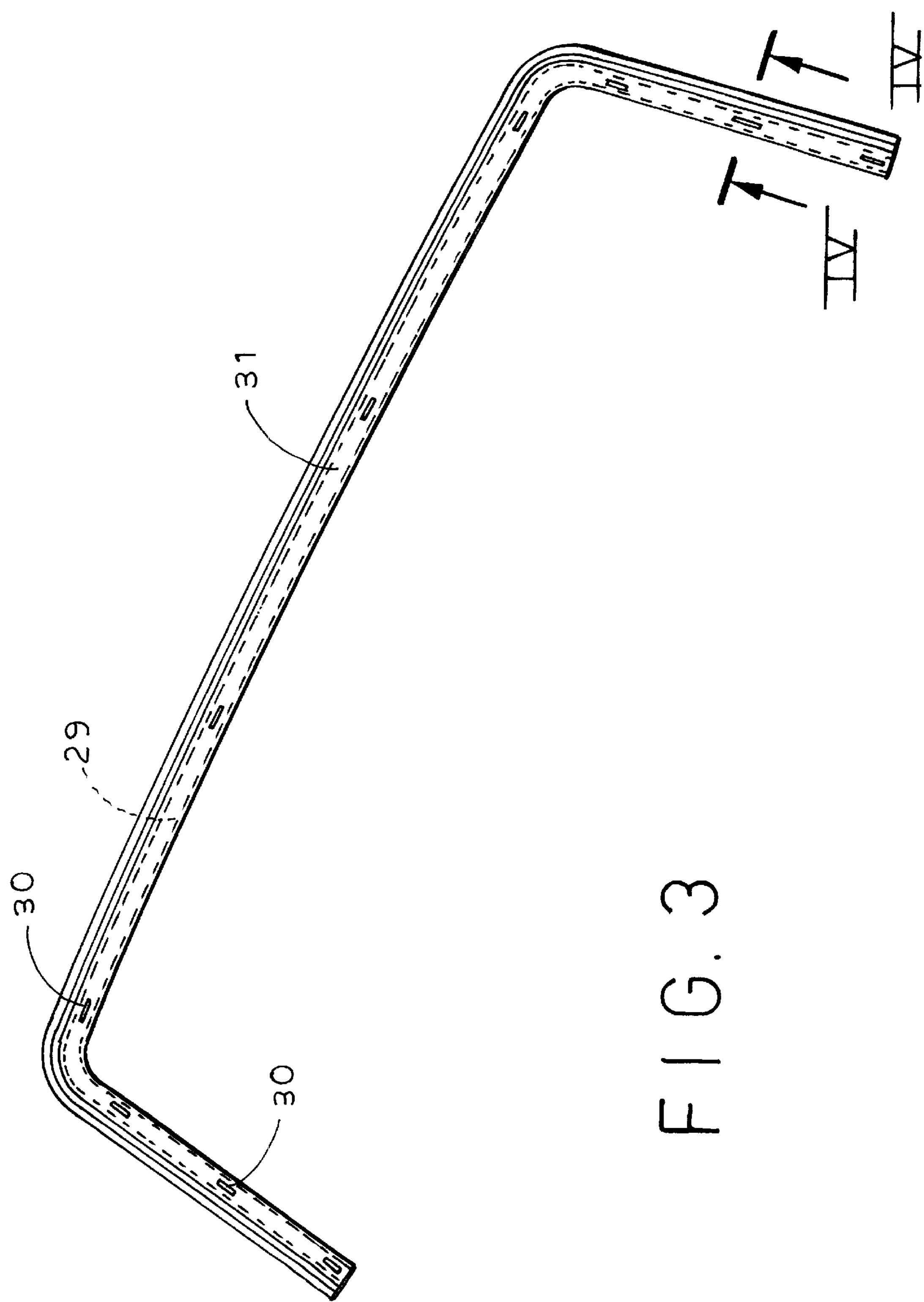
FIG. 3 is the frame element of FIG. 2 covered by the liner fabric.
Figure 4:
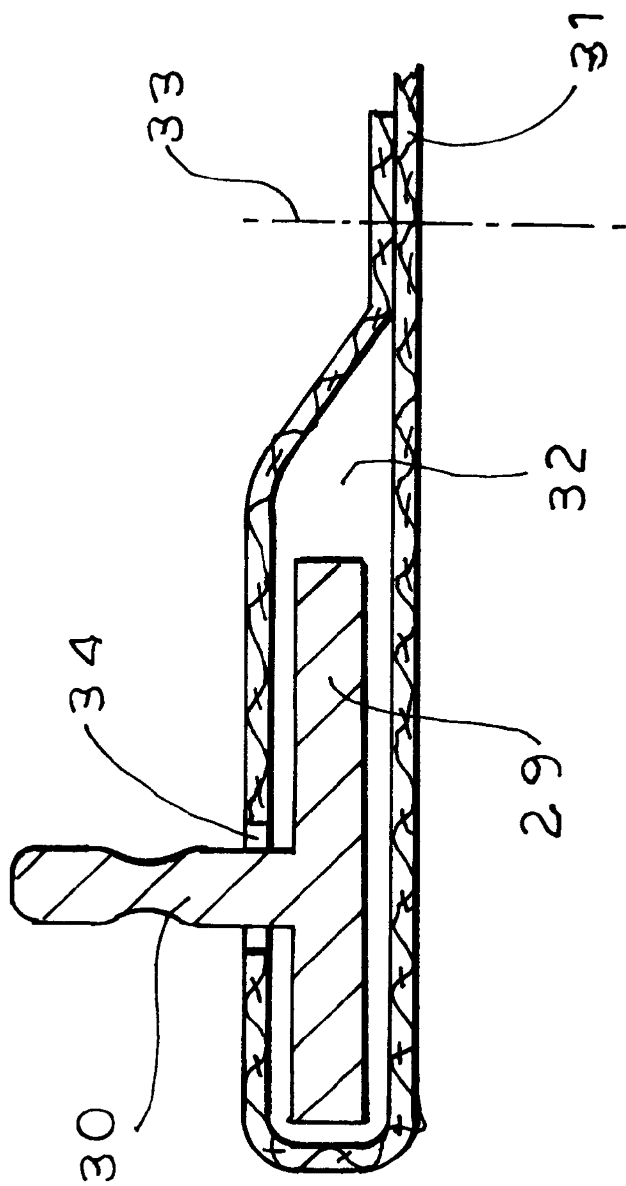
FIG. 4 is a large-scale cross section taken along line IV—IV of FIG. 3.
Figure 5:
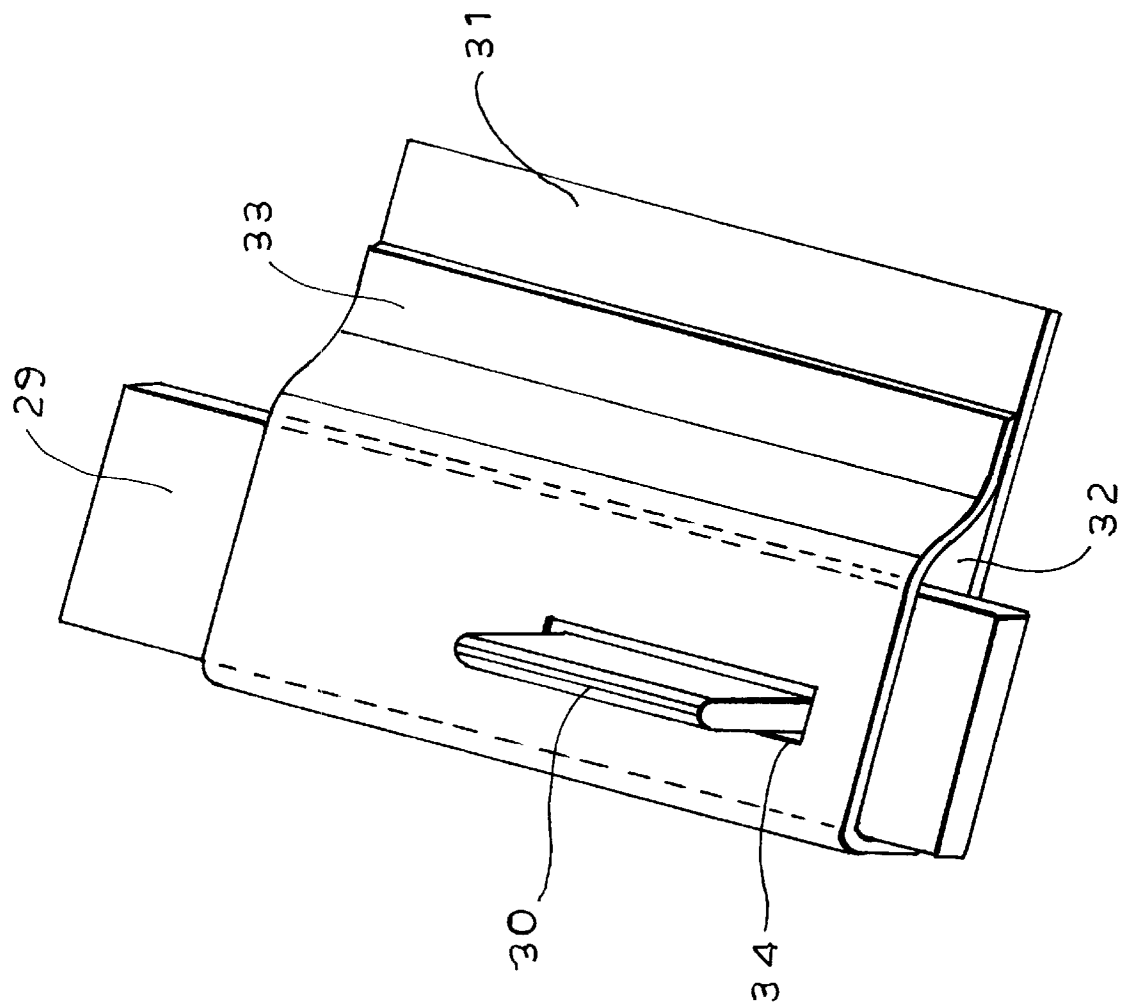
FIG. 5 is a large-scale perspective view of a detail of FIG. 3.

As seen in FIG. 1 a rear convertible window 10 has an outside edge 11 (FIG. 6) seated in a polyurethane seal 12 itself joined to the outer material of the roof which is shown partially as the inner edge 13 of the convertible roof having the window 10. According to the invention a plurality of inwardly (that is toward the interior) seats 26 are formed in the seal 12 adapted to be secured to a mounting strip 29 shown in dashed lines.

Figure 6:
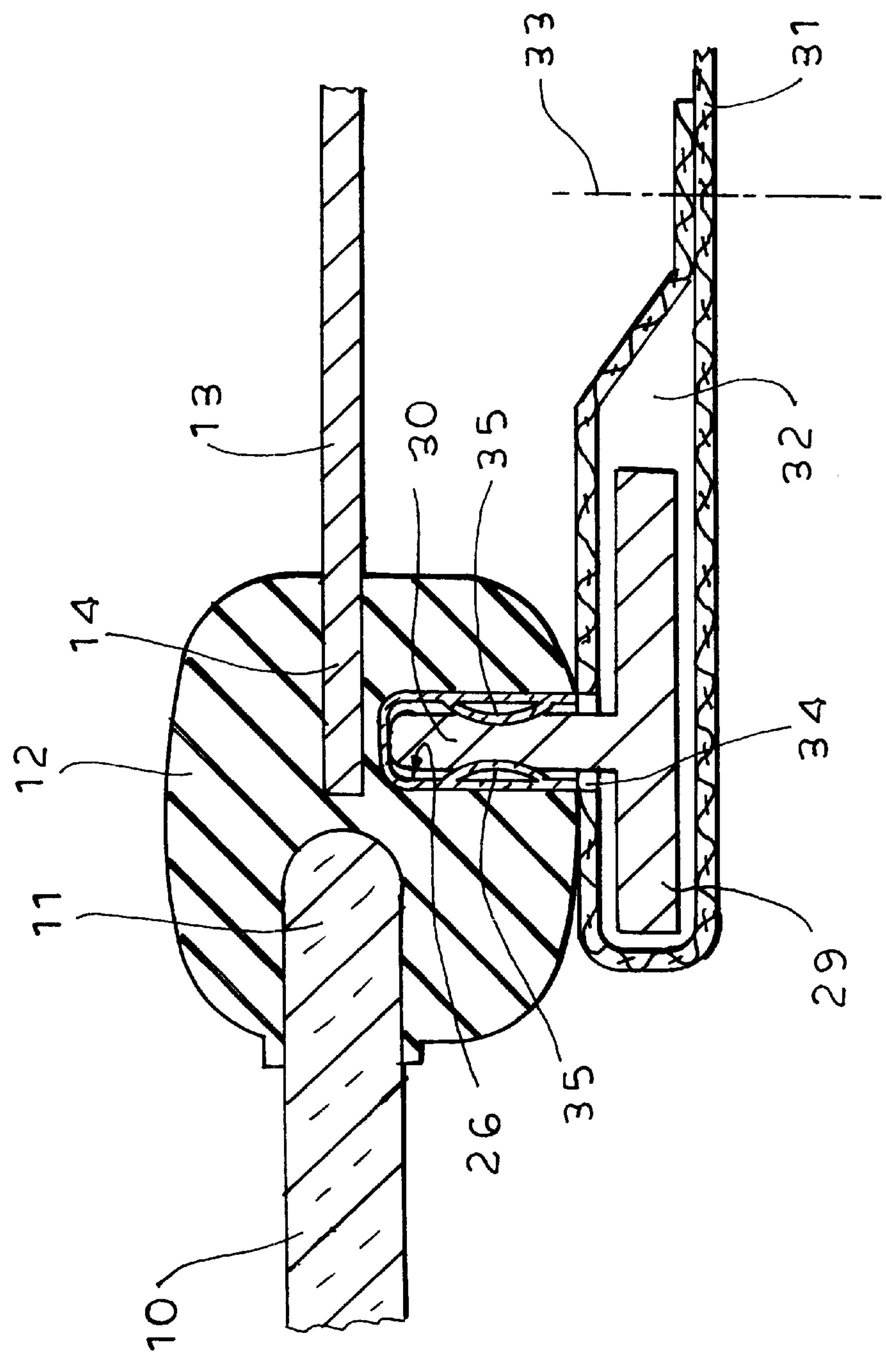
FIG. 6 is a section taken along line VI—VI of FIG. 1.

This mounting strip 29 as shown in FIGS. 2, 3, 4, 5, and 6 is basically a rectangular-section aluminum bar formed with a plurality of outwardly (that is toward the exterior) projecting tabs 30 positioned and shaped to fit in the complementary seat holes 26 in the seal 12. This strip 29 is received in a pocket formed in a folded-over edge of liner material 31 closed by stitching 33 and formed with rectangular holes 34 through which the mounting tabs 30 project. FIG. 6 shows how the holes 26 can be provided with metallic liner clips 35 having tabs that grip and elastically retain the tabs 30. These metallic clips 35 are molded right into the polyurethane seal 12.

Figure 7:
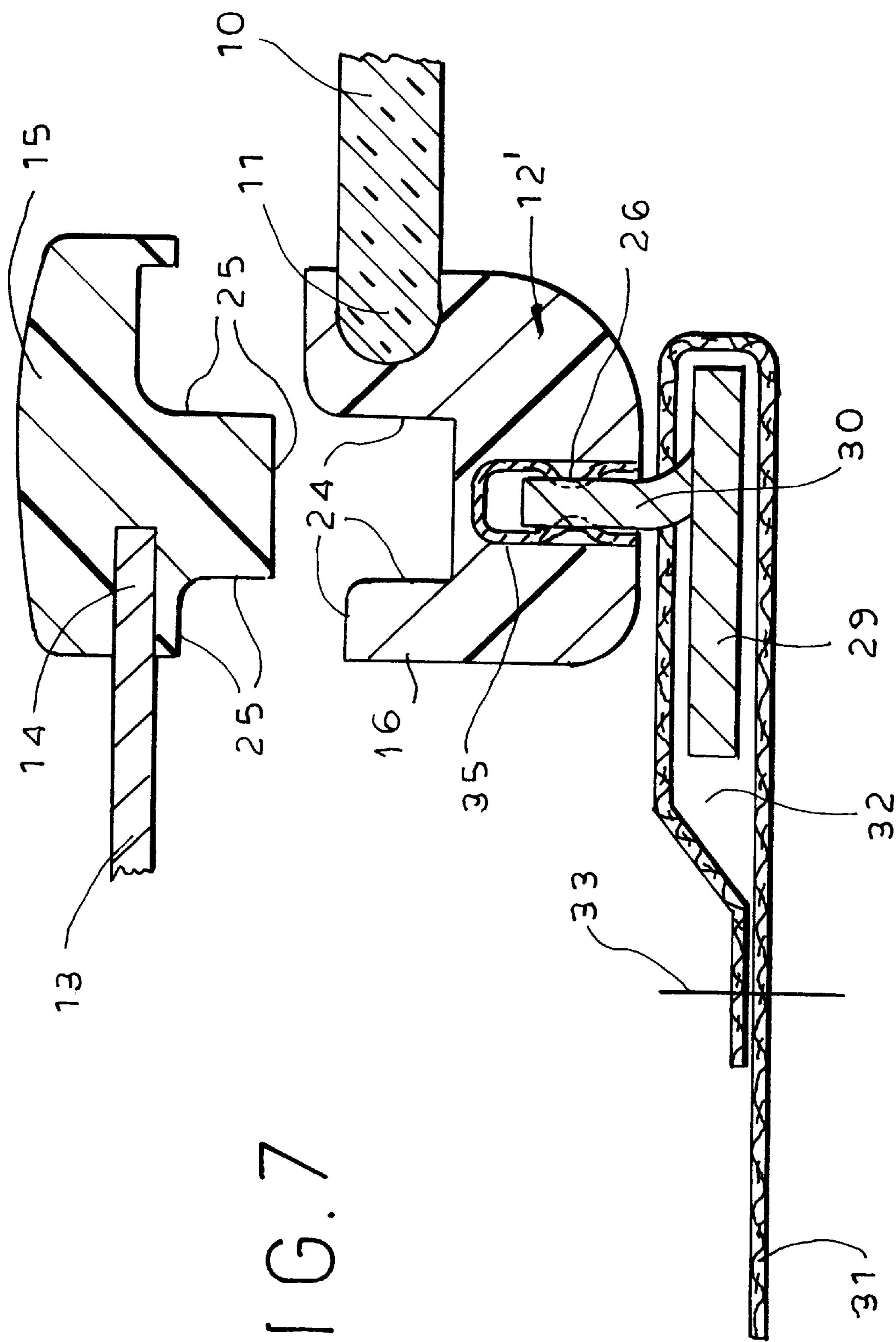
FIG. 7 is a view lie FIG. 6 of another system of this invention in partly exploded view.

In the arrangement of FIG. 7 the strip 12' is comprised as described in the above-cited copending application of a T-section part 15 attached to an inside edge 14 of the outer wall 13 of the roof and a U-section inner part 16 secured to the outside edge 11 of the window 10. The parts 15 and 16 have complementary mating surfaces 25 and 24 which, when fitted together, form a solid and leak-proof connection. They are screwed together as described in the cited application.

Figure 8:
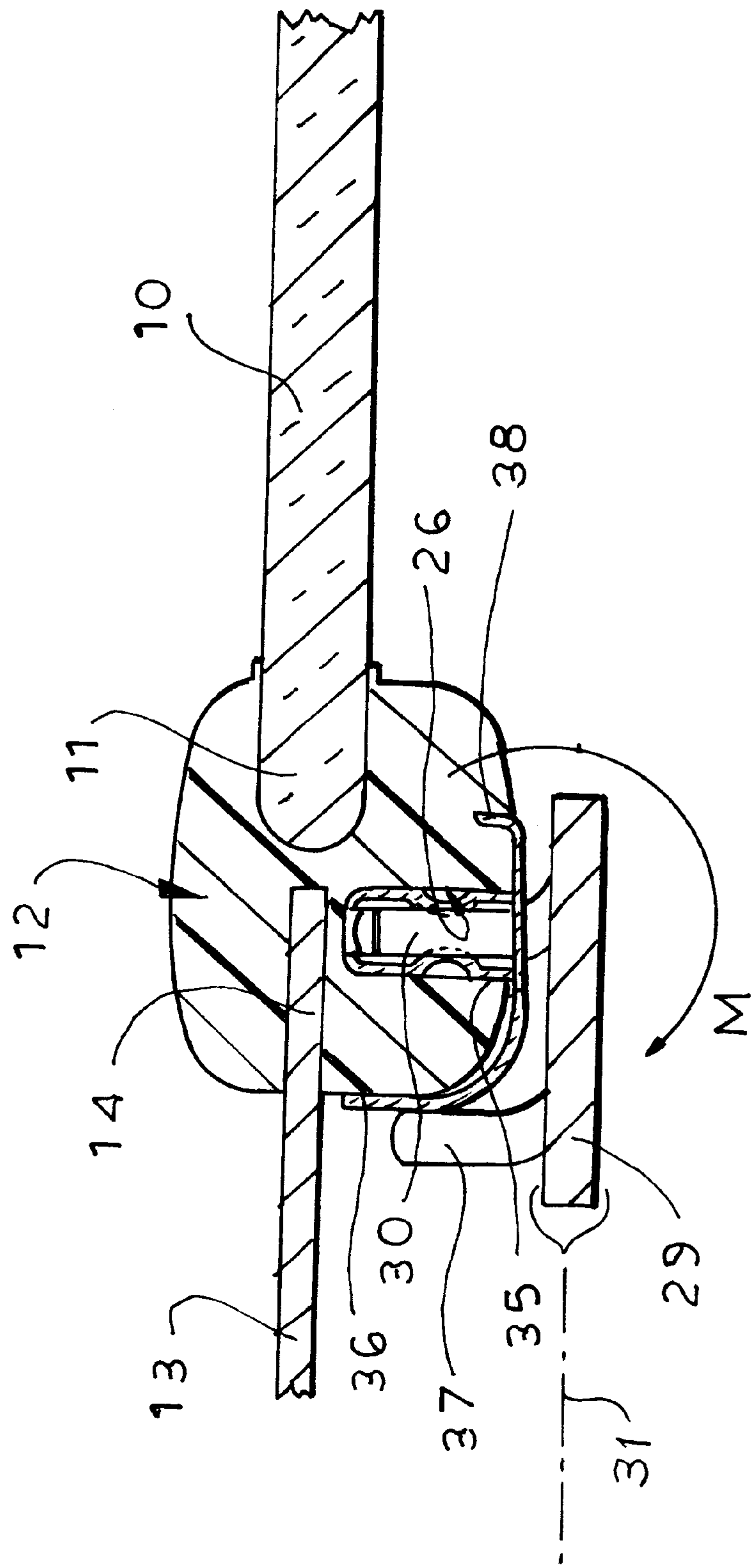
FIG. 8 shows the structure of FIG. 7 in assembled condition.
Figure 9:
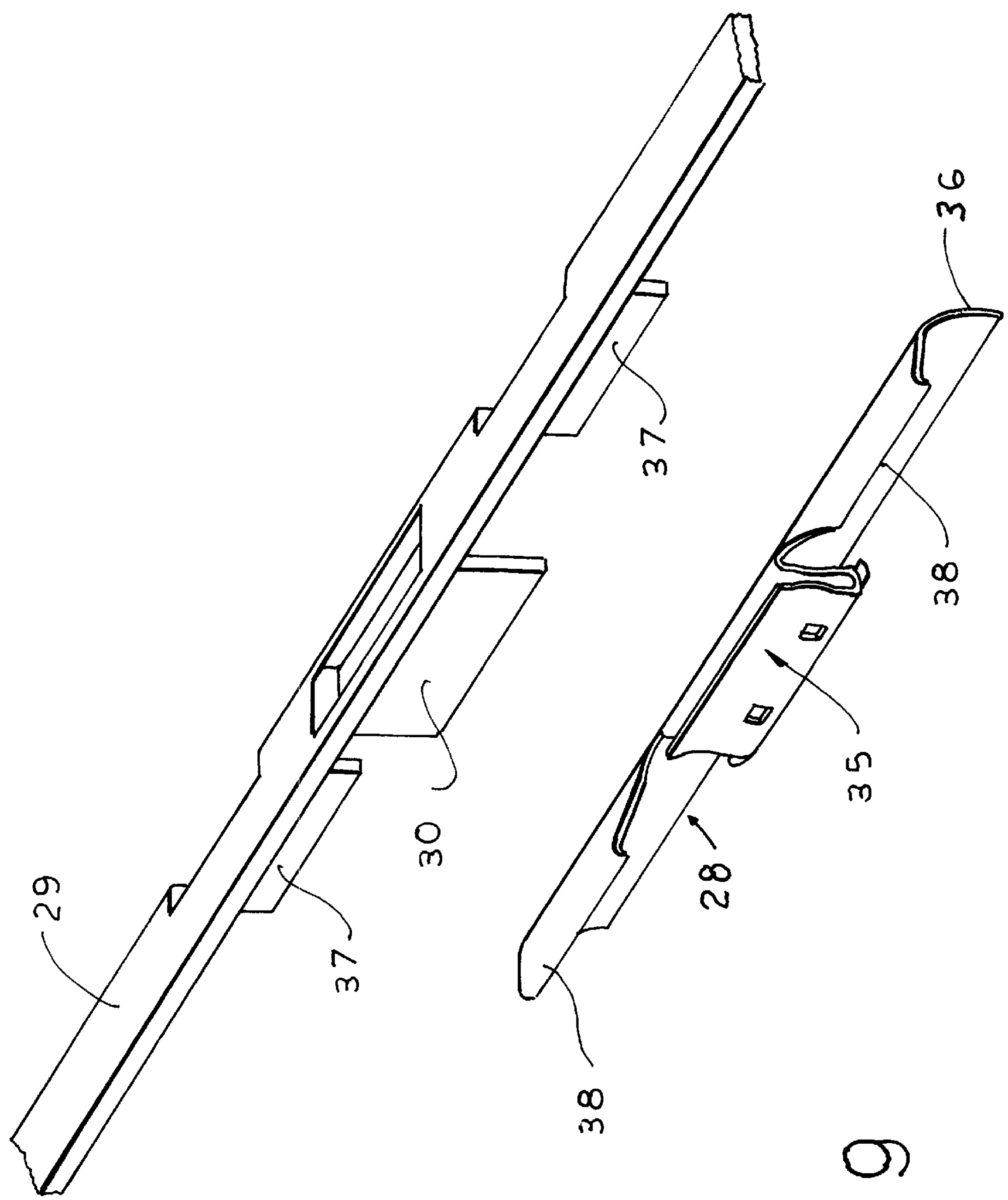
FIG. 9 is a perspective view of elements of the system of FIGS. 7 and 8.

FIGS. 8 and 9 show another arrangement with a one-piece polyurethane seal 12' but here a brace strip 28 is employed that has on its inside edge an outwardly directed lip 38 that is seated in the seal 12" and on its outside edge a leg 36 that overlies the seal 12". In addition this strip 28, which is made of metal, forms the clips 35.

The liner strip 29 here is formed on its outside edge with brace tabs 37 that bear against the leg 36 and thus prevent a pull of the liner material 31 from twisting the bar 28 as indicated by arrow M.

I claim:

1. In a convertible roof:

a window with an outside edge;

an outer frame with an inside edge juxtaposed with the window outside edge;

an annular molded seal fixed to and extending between the window and frame edges for mounting of the window in the frame and formed with a plurality of spaced and inwardly open seats;

a flexible liner formed with a window hole having an inside edge juxtaposed with the seal;

a stiff mounting strip extending along and fixed to at least a portion of the window-hole inside edge of the liner; and respective outwardly directed mounting tabs unitarily formed with the mounting strip and snugly fitted in the seats.

2. The convertible-roof assembly defined in claim 1 wherein the inside liner edge is folded over and forms an elongated pocket receiving the stiff strip.

3. The convertible-roof assembly defined in claim 2 wherein the liner edge is formed at the pocket with respective holes through which the tabs project.

4. The convertible-roof assembly defined in claim 3 wherein the liner edge is stitched adjacent the strip to close the pocket.

5. The convertible-roof assembly defined in claim 1 wherein the strip is of metal.

6. The convertible-roof assembly defined in claim 1 wherein the seats are elongated parallel to the strip and the tabs are complementarily elongated.

7. The convertible-roof assembly defined in claim 1, further comprising clips elastically retaining the tabs in the seats.

8. The convertible-roof assembly defined in claim 7 wherein the clips are metallic.

9. The convertible-roof assembly defined in claim 1, further comprising a reinforcing element overlying an inner face of the seal, the strip having an outwardly directed inside leg bearing on an outside surface of the reinforcing element.

10. The convertible-roof assembly defined in claim 9 wherein the reinforcing strip is formed in each of the seats with a clip elastically retaining the respective tab.

11. The convertible-roof assembly defined in claim 1 wherein the seal includes a window part fixed to the window outside edge and a frame part fixed to the frame inside edge and fitting complementary with the window part.

12. The convertible-roof assembly defined in claim 1 wherein the seal is of polyurethane.

* * * * *